United States Patent [19]

Burkes, Jr.

[11] 4,327,868

[45] May 4, 1982

[54] SWING DISC NOZZLE STRUCTURE FOR RAMJET ENGINE

[75] Inventor: William M. Burkes, Jr., McGregor, Tex.

[73] Assignee: The United States of America as represented by the Secretary of the Air Force, Washington, D.C.

[21] Appl. No.: 43,535

[22] Filed: May 29, 1979

[51] Int. Cl.³ .............................................. F02K 9/86
[52] U.S. Cl. .......................... 239/265.15; 239/265.19; 239/265.33
[58] Field of Search .......................... 60/270 R, 270 S; 239/265.11, 265.19, 265.33, 265.37, 265.15

[56] References Cited

U.S. PATENT DOCUMENTS

| | | | |
|---|---|---|---|
| 3,659,789 | 5/1972 | Schultz | 239/265.19 |
| 3,853,586 | 12/1974 | Olcott | 239/265.11 |
| 3,929,289 | 12/1975 | Kardon et al. | 239/265.11 |
| 3,940,067 | 2/1976 | Cherry et al. | 239/265.11 |
| 3,970,253 | 7/1976 | Burkes et al. | 239/265.19 |

Primary Examiner—Stephen C. Bentley
Attorney, Agent, or Firm—Donald J. Singer; William J. O'Brien

[57] ABSTRACT

A ramjet, swing disc, variable nozzle structure with corrosive resistant, coated graphite inserts positioned within oppositely disposed recesses in the swing disc structure.

4 Claims, 6 Drawing Figures

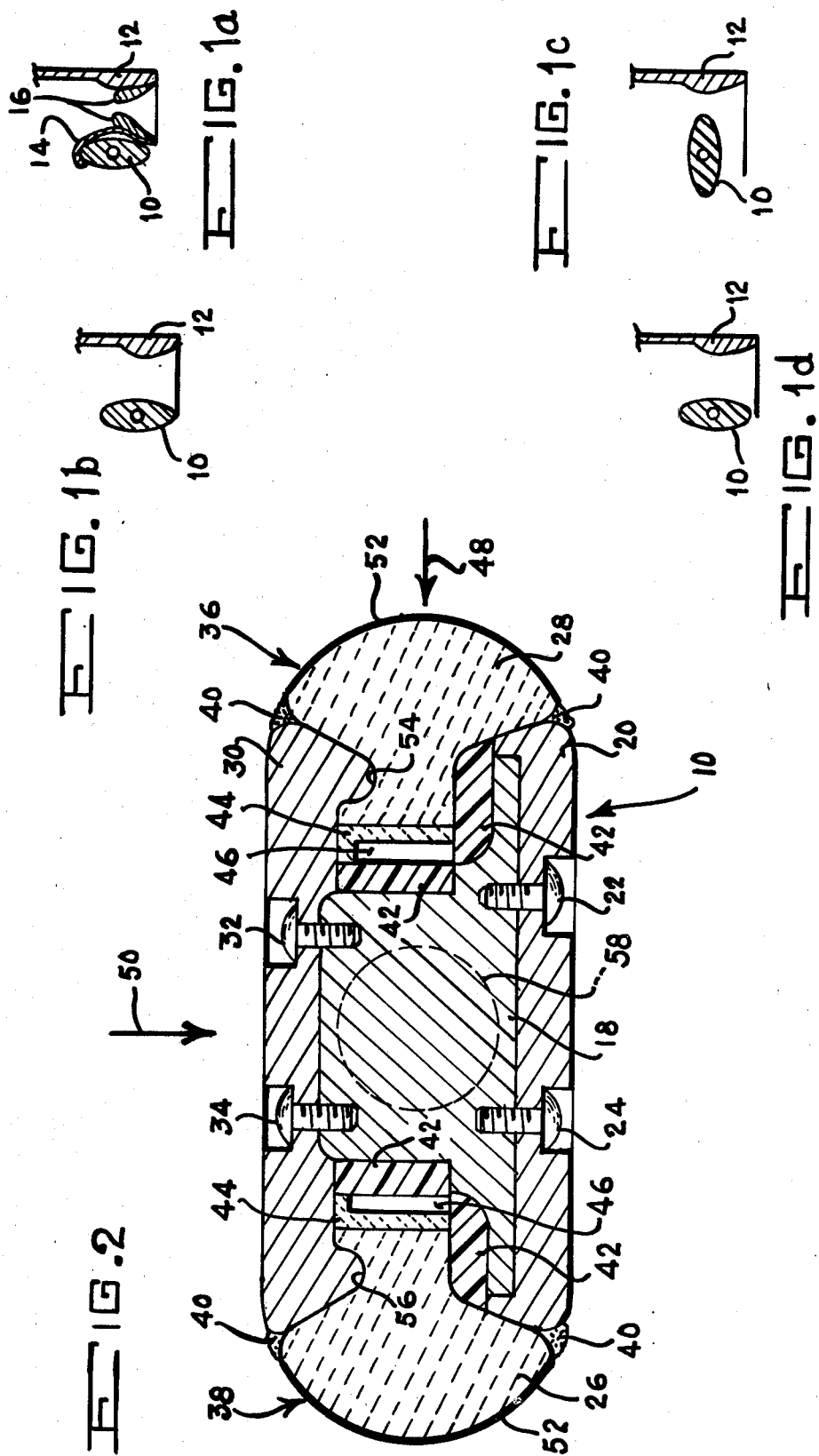

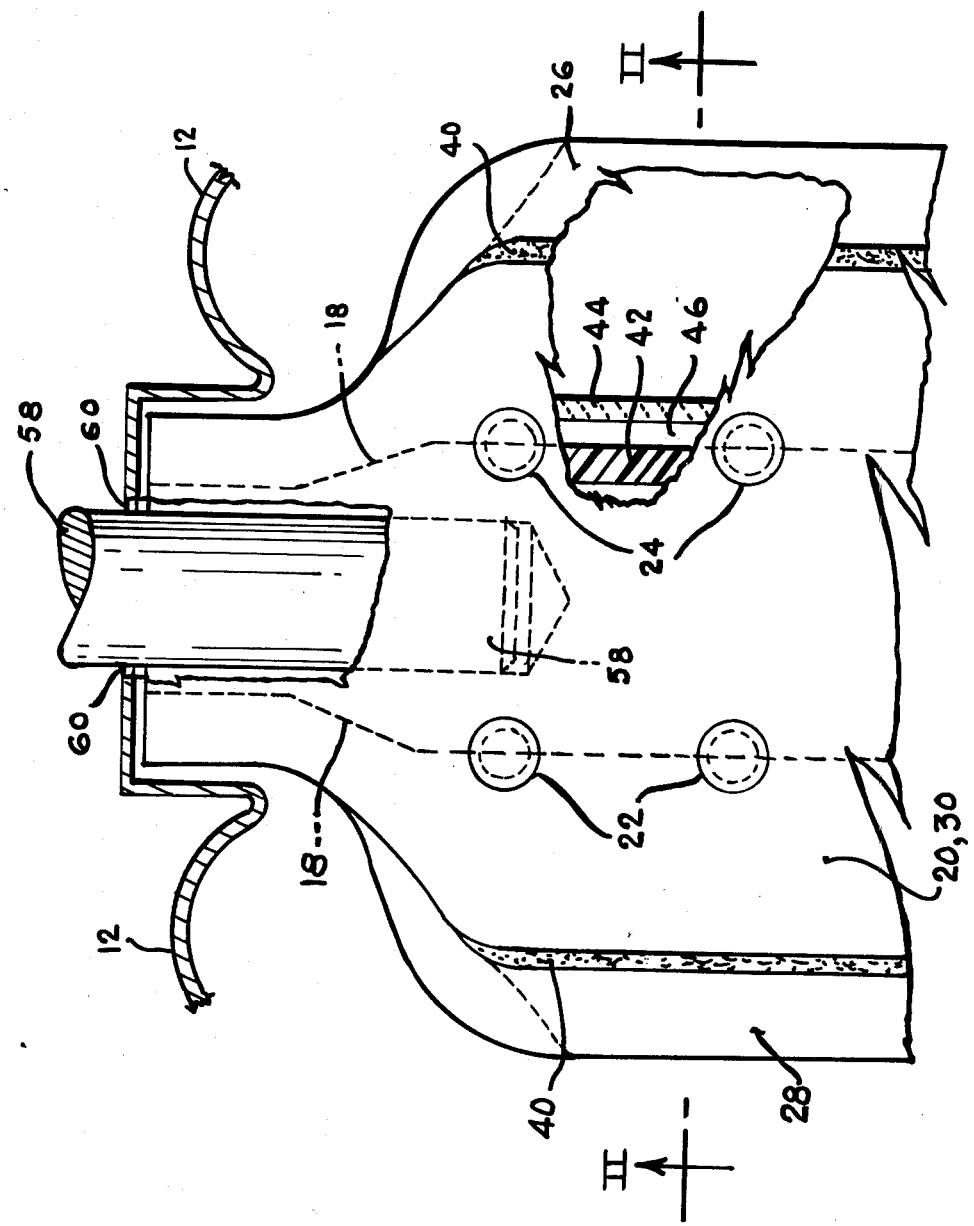

SWING DISC NOZZLE STRUCTURE FOR RAMJET ENGINE

STATEMENT OF GOVERNMENT INTEREST

The invention described herein may be manufactured and used by or for the Government for governmental purposes without the payment of any royalty thereon.

BACKGROUND OF THE INVENTION

This invention relates to ramjet engines and to a nozzle structure for use therewith. More particularly, this invention concerns itself with a swing disc, variable nozzle structure for use in a ramjet engine.

One of the simplest air-breathing, aircraft, power plants is the ramjet engine. Because of its simplicity, it is also sometimes referred to as the "flying stovepipe". Ramjets are somewhat similiar to a turbojet engine without a compressor or a turbine. During operation of the ramjet, compression is obtained through the forward operation of the aircraft during which air is forced into the front of the engine through a diffuser at high velocity. This creates a dynamic pressure or "ram" in the diverging inlet section of the engine. The diffuser is shaped to reduce airspeed and its kinetic energy. Reducing its kinetic energy results in an increase in potential energy in the form of increased air pressure. The higher air pressure enters the combustion chamber of the engine and reacts with an injected fuel to create hot gases which are ejected rearwardly through the engine to provide propulsion.

The ramjet has no thrust at takeoff because at zero flight mach number there is no increase in air pressure through the diffuser. Since the engine has no thrust at takeoff and only low or minimal thrust at low speeds, other means or engines are relied upon to provide a takeoff boost. For example, rockets are used as a booster for missiles while aircraft often use a tubojet as a means for assisting in takeoff. One of the distinct advantages of a ramjet lies in the fact that as the flight speed of the ramjet increases, the pressure ratio and engine efficiency likewise increase with an increase in thrust and a very desirable resulting decrease in fuel consumption.

Another advantage of a ramjet engine is the simplicity provided by its fixed geometry. This simplicity, however, is very deceiving since the pressure, temperature, velocity and volumn of the ejected hot gases all vary as they progress through the ramjet. Also, the airflow passage areas of the engine have precisely calculated values depending on flight conditions, operational altitudes and thrust requirements. If any of these flight values change, the calculated values change also. It becomes apparent, therefore, that if a ramjet engine is to operate efficiently under variable flight conditions and differing altitudes, then a compromise must be made in design characteristics.

The usual compromise is to designate one flight condition as the design point and accept degraded or non-optimum performance at all other flight conditions. For modern ramjets that are expected to operate over a large range of Mach numbers and altitudes this can be a very significant compromise. An alternative approach is to vary the physical geometry of the engine to provide on-design performance at all flight conditions. This, of course, also has severe limitations; generally it is practical only to vary the flow areas of the ramjet inlet and nozzle. Even this limited variation can become quite complicated, however, and it is necessary to examine the design and the application in detail to determine the type and amount of variable geometry that will provide the desired result.

For example, the Advanced Strategic Air Launched Missile (ASALM) engine is a multi-purpose integral rocket ramjet designed for operation from about Mach 2.0 at low altitudes to Mach 4.5 at high altitudes. The missile is boosted from aircraft launch velocity by an integral solid rocket to about Mach 2.0 for ramjet takeover. The ramjet engine continues the missile acceleration to the cruise condition, and then continues operation for the cruise mission. However, the missile, which is designed to fit in the restricted boundaries of the B-1 rotary launcher, is severely volume limited. This limitation creates the need to obtain maximum performance from the ramjet engine to meet mission requirements. However, if the engine geometry is designed to provide maximum performance at the ramjet takeover Mach number, then the performance at the cruise Mach number will be far from optimum. Typically, the inlet may operate 30% supercritical at the cruise condition.

With awareness of this problem, it became obvious that a variable geometry engine would overcome, or at least significantly minimize, the effects of the problem. A considerable research effort was undertaken, therefore, with the resultant testing of numerous inlet and nozzle designs. Early in the research program it became apparent that because of the severe volume limitations and the relatively short engine operating times (typically 10 minutes), the geometry variation mechanism would need to be quite simple. It was also determined that discrete positioning components with two or three positions would provide nearly as much benefit as continuously varying components. Another significant fact discerned was that a variable nozzle alone can provide significant benefit, while a variable inlet alone provides only minimal benefit. As a result, a two-position swing disc nozzle structure was designed and subjected to further study and test evaluation. The study indicated that incorporation of this component in a 15-inch diameter multi-purpose missile potentially doubled its range. Wind tunnel tests of the inlet and cold flow performance tests of the nozzle were performed. Variable nozzle performance was most promising. Since the variable nozzle, by itself, provided a significant advantage for the ASALM engine.

The swing disc nozzle structure comprised a disc-shaped body positioned within the nozzle of a ramjet engine to form oppositely disposed throat sections for air passageways. Unfortunately, the severe operational conditions which exist within the ramjet engine, cause a considerable amount of oxidation to take place. This results in corrosion and erosion of the leading edge surfaces of the disc structure.

With the present invention, however, it was found that the degradative effects of the oxidizing conditions could be overcome by providing the disc assembly with coated graphite inserts positioned in recessed areas to form the leading edge of the swing disc. Coatings for the graphite insert can be selected from corrosion resistant hafnium, zirconium and silicon carbide coating materials which are applied to the graphite insert in accordance with conventional coating methods. The resulting disc nozzle structure was found to resist the effects of the corrosive and erosion condition, thus maintaining the design contour of the nozzle's throat areas during flight.

SUMMARY OF THE INVENTION

The present invention concerns itself with a swing disc, variable nozzle structure for use in a ramjet engine. The swing disc structure has been found to be most effective in varying the geometric design configuration of the ramjet engine thereby making it compatible with varying high pressure and mass flow ramjet combustion conditions. Unfortunately, the severe conditions of oxidation which exist during flight bring about the erosion and corrosion of those areas of the disc structure which are subjected to these strenuous conditions. Particularly, susceptible to corrosion are the leading edges of the swing disc which forms part of the two throat areas. In order to overcome this problem, coated graphite inserts are placed within the throat areas of the nozzle to form exposed surfaces to the oxidizing conditions. This structure is effective in preventing corrosion and erosion of the disc structure portion of the throat area configuration. The corrosion resistant coating material for the graphite insert can be selected from hafnium, zirconium or silicon carbides.

Accordingly, the primary object of this invention is to provide a swing disc nozzle structure that can operate effectively within the high pressure and mass flow combustion conditions of a ramjet engine.

Another object of this invention is to provide a swing disc nozzle structure configured with surface coated graphite inserts positioned therein to prevent corrosion and materials loss in the leading edges of the swing disc structure.

The above and still other objects and advantages of the present invention will become more readily apparent upon consideration of the following detailed description thereof when taken in conjunction with the accompanying drawings.

DESCRIPTION OF THE DRAWINGS

In the drawings:

FIGS. 1a, 1b, 1c and 1d are schematic illustrations showing the operational sequence of a two-area, swing disc, ramjet nozzle structure;

FIG. 2 represents a sectional view of a swing disc structure having the graphite inserts of this invention, and FIG. 3 is a top view, partly in section, of the swing disc structure of FIG. 2.

DESCRIPTION OF THE PREFERRED EMBODIMENT

Pursuant to the above-defined objects, the present invention provides a swing disc nozzle assembly with coated graphite inserts positioned within the disc structure. In the basic ramjet swing disc nozzle concept, a disc-shaped body is mechanically supported and positioned in the throat plane area of the engine and provides two discrete throat areas. Area modulation is achieved by a simple 90° body rotation from the acceleration position to the cruise position. Excellent nozzle performance for ramjet engines using the swing disc nozzle concept while operating under a variety of flight conditions has been confirmed by extensive testing.

To illustrate the environment and the operational sequence of a swing disc nozzle, reference is made to the illustrations in FIGS. 1a through 1d of the drawings. In FIG. 1a, a swing disc nozzle 10 is positioned within the forward throat area of a ramjet engine 12. At solid booster burnout, an explosive charge, not shown, retracts the retainer ring 14, and boost-grain tail-off pressure ejects the booster nozzle 16. The now-exposed ramjet swing disc 10 functions in the ramjet acceleration mode with the disc parallel to the missile's longitudinal axis as shown in FIG. 1b.

On cruise command, an electrical signal fires a pressure cartridge in the base of an actuator cylinder, not shown. The generated pressure frees and drives a piston to the end of its travel, rotating the disc 10 and locking it in its 90° position. As shown in FIG. 1c, the disc is now perpendicular to the missile longitudinal axis and provides the desired cruise throat-area ratio.

On terminal boost command, a pressure cartridge on the forward end of the actuator is fired. This frees and drives a piston to its retracted position, thus rotating the disc to its original position as shown in FIG. 1d to permit increased fuel flow and thrust for added maneuvering capability. Obviously, the area ratios and design values can be tailored for specific vehicle application.

In order to further illustrate the particular disc nozzle concept of the present invention, reference is now made to FIG. 2 of the drawing, a cross section along lines II—II of FIG. 3, which discloses a swing disc structure 10. It comprises a generally oblong discoid having a generally T-shaped cross section metal centerbody 18 having a top portion and a perpendicular center portion which joins said top and forms the bottom of said T-shape. Affixed to the bottom of the T-shape of the centerbody 18 by means of insulation plate attachment screws 32 and 34 is a fore side insulation retainer flange 30. Two coated graphite throat inserts 26 and 28 are located parallel with and on each side of the perpendicular center portion of said T-shaped center body 18 and are retained by the fore side insulation flange 30 and an aft, side insulation, retainer flange 20 which is affixed to the centerbody 18 by means of attachment screws 22 and 24. The fore flange 30 engages grooves 54 and 56 in the bases of the graphite inserts 26 and 28. Also aiding in retaining the graphite bodies 26 and 28 within the oppositely disposed recess areas 36 and 38, formed between the underside of the top portion of the T-shaped centerbody 18 and the side flanges 20 and 30, are bonded interfaces of a conventional, intumescent or heat swelling material 40. The material 40 also acts as a gas seal between the graphite bodies 26 and 28 and disc internal insulation 42. A premolded sheet of intumescent material 44, similar in content to material 40, is placed at the base of the graphite bodies 26 and 28 in conjunction with a porous, compressible, ceramic felt insulation layer 46 to allow intumescent material expansion and sealing without exerting undue expulsion forces on the graphite bodies 26 and 28. Arrow 48 indicates the upstream surface upon which the air flow impinges in the open position for the disc 10 during operation within a ramjet engine 12 while arrow 50 indicates the surface upon which the air flow impinges in the closed position.

As can best be seen in FIG. 3, the generally oblong discoid shape of the swing disc 10 is tapered at its ends such that shafts 58 are journalled in the centerbody 18 and the nozzle structure 12 at 60 such that the fixed, geometrically designed throat area of the nozzle may be varied by rotation of the swing disc 10.

Hafnium carbide, zirconium carbide and silicon carbide have been found to be especially effective as coating materials for preventing undue erosion and corrosion of the graphite bodies 26 and 28. The carbide coating, as shown at 52, can be applied to the graphite bodies using conventional industrial coating procedures. The particular coating material selected depends on the type of graphite used in fabricating the bodies 26 and 28 and is selected in order to best match the thermal coefficient of expansion for the particular graphite.

While the principles of this invention have been described with particularity, it should be understood that various alterations and modifications can be made without departing from the spirit of the invention, the scope of which is defined by the appended claims.

What is claimed is:

1. In a swing disc ramjet nozzle assembly comprising a nozzle having a fixed, geometrically designed, throat area and a generally oblong discoid swing disc structure positioned therein and rotatable about a central axis to vary the geometry of said throat area;

the improvement wherein said disc structure comprises:

a. a metallic generally T-shaped center body having a top portion and a perpendicular center portion, the remote end of which forms the bottom of said T-shape;

b. fore and aft side insulation retainer flanges each being affixed to one of the top and bottom portions of said T-shaped center body; and c. a pair of graphite inserts mounted parallel with and on each side of the perpendicular center portion of said T-shaped center body and each being retained thereon by said fore side insulation retainer flange affixed to the bottom of said center body; said aft flange also engaging said graphite inserts, said graphite insert having a corrosion resistant coating material deposited on the exposed surfaces thereof.

2. In a disc structure as defined in claim 1 wherein the improvement includes a groove in each of said pair of graphite inserts, for engagement by a mating portion on said fore side, insulation, retainer flange.

3. In a disc structure as defined in claim 1 the improvement wherein said coating material is selected from the group consisting of hafnium carbide, zirconium carbide and silicon carbide.

4. In a disc structure as defined in claim 1 the improvement wherein a gas sealing layer of intumescent material and an insulating layer of ceramic felt are positioned between said graphite insert and the top portion of said T-shaped center body.

* * * * *